US011745099B2

(12) United States Patent

Ronsse

(10) Patent No.: US 11,745,099 B2

(45) Date of Patent: *Sep. 5, 2023

(54) SYSTEMS AND METHODS OF TRANSFERRING STATE DATA FOR APPLICATIONS

(71) Applicant: NINTENDO CO., LTD., Kyoto (JP)

(72) Inventor: Sébastien Ronsse, Seattle, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,201

(22) Filed: Oct. 26, 2021

(65) Prior Publication Data

US 2022/0040571 A1 Feb. 10, 2022

Related U.S. Application Data

(63) Continuation of application No. 16/585,697, filed on Sep. 27, 2019, now Pat. No. 11,179,630.

(51) Int. Cl.

*A63F 13/49* (2014.01)
*A63F 13/30* (2014.01)
*A63F 13/323* (2014.01)
*G06F 13/38* (2006.01)

(52) U.S. Cl.

CPC ............ *A63F 13/323* (2014.09); *A63F 13/30* (2014.09); *A63F 13/49* (2014.09); *G06F 13/38* (2013.01); *A63F 2300/554* (2013.01)

(58) Field of Classification Search

None

See application file for complete search history.

(56) References Cited

U.S. PATENT DOCUMENTS

2012/0086630 A1 4/2012 Zhu
2012/0309542 A1 12/2012 Nogami
2014/0287818 A1 9/2014 Chan

*Primary Examiner* — Damon J Pierce

(74) *Attorney, Agent, or Firm* — Nixon & Vanderhye P.C.

(57) ABSTRACT

A computer system that includes at least two game devices is provided. A first game device is used by a user to play a game and a second game device is used to receive state data regarding playing the game on the first game device. The state data is continuously applied to a game that is executed on the second game device to allow for the user to seamlessly transition to playing the game on the second game device.

20 Claims, 5 Drawing Sheets

SYSTEMS AND METHODS OF TRANSFERRING STATE DATA FOR APPLICATIONS

CROSS REFERENCE(S) TO RELATED APPLICATION(S)

This application is a continuation of Ser. No. 16/585,697, filed Sep. 27, 2019, now allowed; the entire contents of which is being incorporated herein by reference.

TECHNICAL OVERVIEW

The technology described herein relates to techniques for transferring data regarding the state of an application between different computers. More particularly, the technology described herein relates to allowing for a seamless transition of using an application on one computing device to using the application on another computing device by transferring state data of that application between the devices.

INTRODUCTION

We live in a mobile society in which people increasingly depend on mobile devices for work, information, and entertainment. People check and compose emails, watch movies, browse the Web, play video games, and perform countless other tasks on their mobile devices throughout a given day. But while such devices can be flexible (e.g., they are portable and can be carried by a person), that flexibility can come at the cost of battery life, smaller screen sizes, limited processing power, and the like.

Accordingly, it will be appreciated that new and improved techniques, systems, and processes are continually sought after that allow users to flexibly play, work, or otherwise use their computing devices. For example, techniques for facilitating or allowing users to use and experience the same applications and other content between computer systems in a seamless manner.

SUMMARY

In certain example embodiments, a system for transferring video game execution among different computing devices is provided. The system includes at least two computing devices where a first computing device is being used by a user to play a video game. While being played by the user, state data for the video game (e.g., the game application program) is being saved and transmitted via a computer network to a second computing device. The second computing device continually executes a computer application for the video game while receiving the state data from the first computing device. Once a gameplay switch input is provided to the second computing device, then primary execution of the video game switches from the first computing device to the second computing device and images of the virtual game space of the video game are output to a display device that is coupled to the second computing device.

In certain example embodiments, a computer system automatically detects the presence of another computer system on the same computer network that is playing a video game. In response to this determination, the computer system automatically starts a video game application program for the detected video game and runs it in the background on the computer system.

In certain example embodiments, a computer system receives game state data from another computer system and applies the game state data to a first game application that is being executed without using user inputs. In response to a game switch input, the computer system continues to execute the first game application, but now relies on or uses user inputs provided via an input device that is coupled to the computer system.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional elements, techniques, protocols, etc. in order to provide an understanding of the described technology. It will be apparent to one skilled in the art that other embodiments may be practiced apart from the specific details and examples described below. In certain instances, detailed descriptions of well-known methods, systems, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1A:
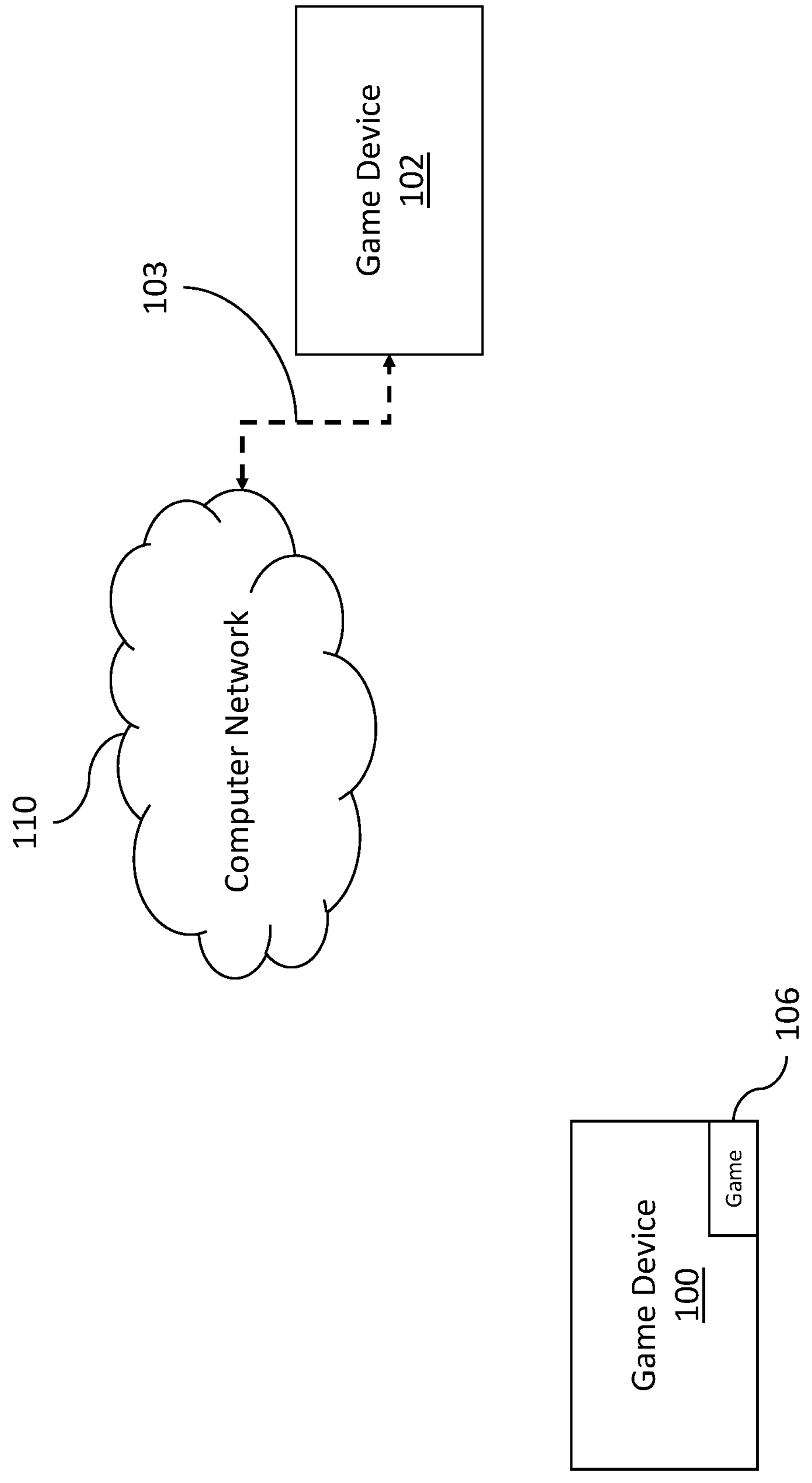
FIGS. 1A and 1B show two example game devices and how a game being played on one device can be transferred to being played on a second device.
Figure 1B:
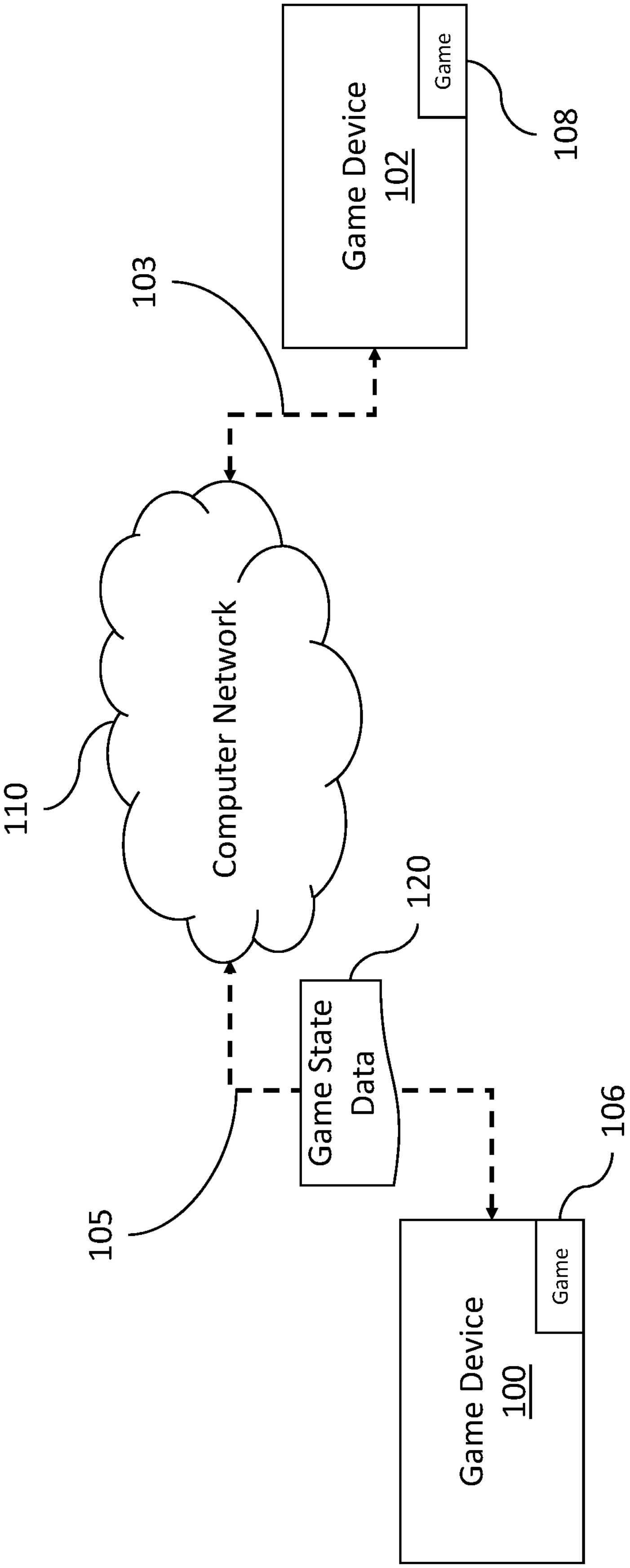
Figure 2:
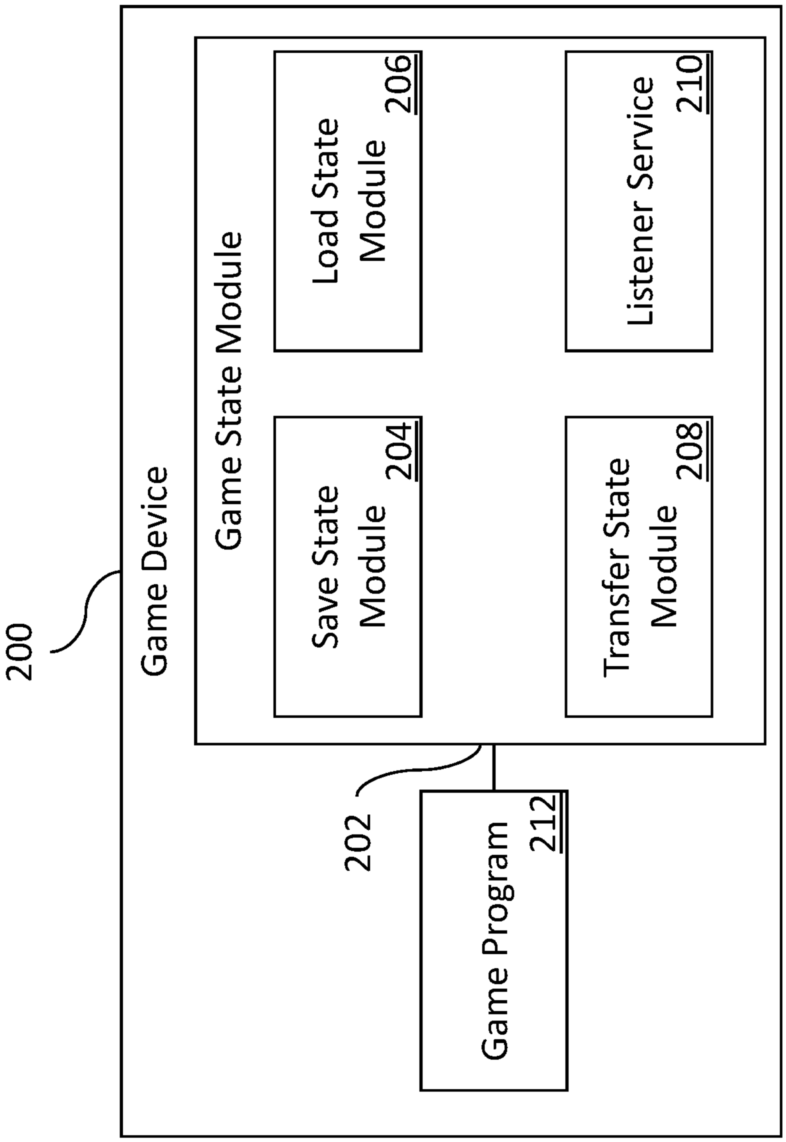
FIG. 2 shows an architecture diagram of an example game device according to certain example embodiments.

In many places in this document, including but not limited to the description of FIGS. 1A, 1B, and 2 software modules, software components, software engines, and/or actions performed by such elements are described. This is done for ease of description; and it should be understood that, whenever it is described in this document that a software module or the like performs any action, the action is in actuality performed by underlying hardware elements (such as a processor, hardware circuit, and/or a memory device) according to the instructions/functionality that comprise the software module or the like. Further details regarding this are provided below in, among other places, the description of FIG. 4.

Overview

Figure 3:
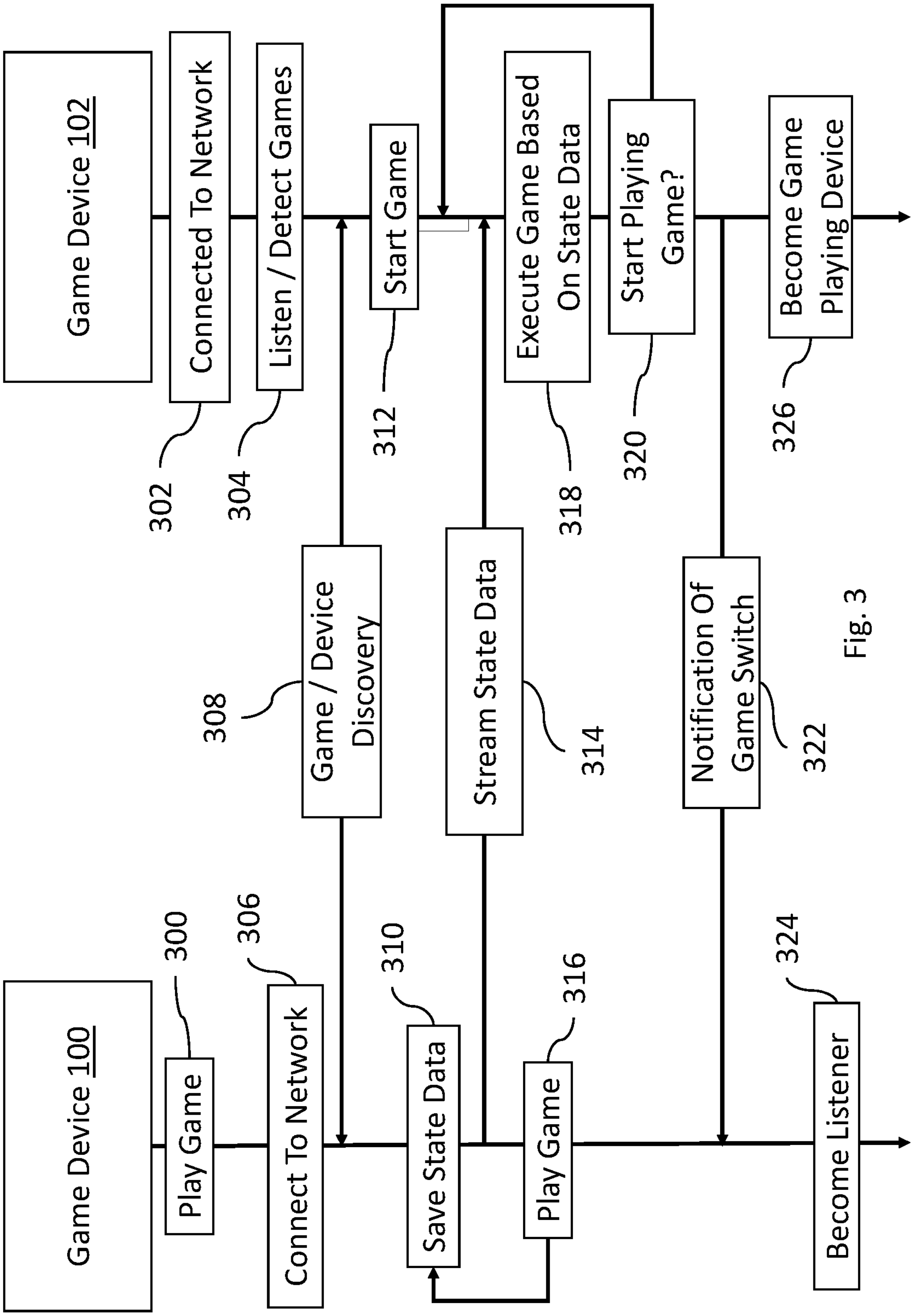
FIG. 3 is a signal diagram showing communication between the game devices of FIGS. 1A and 1B according to certain example embodiments.

As illustratively shown in FIGS. 1A and 1B, functionality is provided that allows users to switch (e.g., seamlessly) between computer systems that are executing the same or similar computer applications (such as video games). In certain examples, the seamless transition is provided by transferring (e.g., continuously or streaming) state data of an application running on a first computing device to a second computing device that is running (or will start running) the same or similar application (such as a video game application) on the second computing device. The application on the second computing device may be executed in the background and the execution of such an application may be not be readily visible to a person that is operating and/or viewing the display of the second computing device. An example game device (e.g., a computing device that is used to play a video game) is shown in FIG. 2 that provides functionality for handling saving, transferring, and loading state data. FIG. 3 is a signal diagram that shows how two different game devices communicate with one another according to certain example embodiments. For example, while the user is playing a game on the first computing device, state data is repeatedly transferred (e.g., streamed) from the first to the second device until, for example, the user decides to switch to playing the game on the second computing device. When the user switches to using the second computing device (and the game that is running thereon), the already started game that had been updated with the repeatedly transferred state data handles a seamless transition to the second game device for the user. The first game device then switches to becoming a listener device. In effect, the two game devices switch roles, one becomes the device playing a game (and providing state data), and the other becomes a device listening to and updating the game (based on provided state data).

Description of FIGS. 1A and 1B

FIGS. 1A and 1B illustratively show two example game devices, 100 and 102, and how a user can transfer playing a game on a first device 100 to playing the game on the game device 102. In FIGS. 1A and 1B, game device 100 may be a mobile device (e.g., a Nintendo Switch, Apple iPhone, a Nintendo 3DS, and other possible computing devices) and game device 102 may be a home video game console or desktop computer system that is configured with, for example, the Microsoft Windows operating system.

Game devices 100 and 102 are examples of computing device 400 that is described in connection with FIG. 4. While the term "game" device is used in connection with certain example embodiments herein, this is done for ease of use and any type of computing device may be used. Indeed, a "game" device as used herein may be a computing device (e.g., a mobile phone, tablet, home computer, etc.) that is being used (or will be used) to play a video game at that time. A non-limiting illustrative list of computing devices may include, for example, a smart or mobile device (e.g., a smart phone), a tablet computer, a laptop computer, a desktop computer, a home console system, a video game console system, a home media system, and other computer device types. As explained in connection with FIG. 4 computers can come in different sizes, shapes, functionality and the like.

Game devices 100 and 102 may include different CPU and/or GPU architectures. For example, game device 100 may have an Intel CPU architecture (e.g., x86) and game device 102 may have an ARM architecture. In certain examples, the processing capabilities provided by the CPU, memory components, GPU, and/or other hardware components that make up a given game device may be different between game devices. Thus, for example game device 102 may be more "powerful" than game device 100 (e.g., in terms of potential processing throughput). In certain example embodiments, the type (or size) of display screen (e.g., a smaller display screen from a mobile device versus a larger monitor coupled a desktop computer or a television coupled to a home video game console). In certain examples, the type or size of input device may be different. For example, a mobile device may use a touch screen to provide user input to a game a desktop computer system may use a keyboard and mouse, or a home console may use a video game controller. In certain examples, one game device may include haptic feedback, force feedback, or other vibration devices and another game device may not. Accordingly, as gameplay is switched between different game devices, different types of physical components, input devices, and/or accessories associated with the game being played on the given game device may change.

In certain example embodiments, a game device may use cloud-based computing resources (e.g., CPUs, memory device, and/or GPUs that are hosted in a cloud-based computing environment) to execute a game program. The results of that execution by the cloud-based computing resources (e.g., game images, etc.) may then be continuously sent to the game device that is being used by a user. With such an implementation, a user may switch between executing a game program locally on their mobile device (e.g., a first game device) to having a cloud-based computing environment handle (e.g., a second game device) the execution of a game program for the game that they are playing. The results of such execution may then be provided to the same mobile computing device or a different device (e.g., a television). Similarly, the video game can be executed locally on a first device, such as a home or portable game console, while sending game state information to a cloud-based computing resource (e.g., the second device) that is executing the game as it receives the game state information. The user may then switch at any time to using the cloud-based computing resource as the computing device that the user is "playing" the game on (e.g., a primary computing device). In such an example, the user then provides inputs to the cloud-based computing resource over a network (e.g., possibly via the same first device) and the display (e.g., the images) is provided (e.g., streamed) to the first device (or another device as specified by the user). Thus, a user may start playing on a home console, which is executing the game being played on that home console. While the game is being played, game state information may be provided to a cloud-based computing resource. The user may then switch over to a mobile device, which may then allow the user to continue playing the game, but this time by using the cloud-based computing resource to handle the processing for the game. The mobile device may be used to provide input (which is passed onto the cloud) and display images (received from the cloud).

In certain example embodiments, a difference in processing power (e.g., of the CPU and/or GPU) of a given game device may allow for one or more features of a game that is executing on that respective game device to be customized. Features may include, for example, increasing or decreasing graphical detail (or other generated output). For example, graphical models with a higher polygon count may be used on one game device with a more powerful GPU versus another game device that has a less powerful GPU. Such advantages may be particularly evident when switching between, for example, a mobile device and a home console or desktop computer system. The mobile device may use lower polygon count models that are used to generate game images for a 10 inch 720p display when the user is playing on their mobile device. In contrast, a home video game console may use higher polygon count models that are used to generate game images for a 75 inch 4k television when the user is playing on their home video game console.

In certain example embodiments, different game devices may run different operating systems or other system software. In such instances the version or instance of the game program that is used to run the same game may be different between the respective game devices that are running different system software. For example, one version of a game program may be compiled to run on a Linux architecture, another may be compiled to run on a Microsoft Windows architecture, another may be compiled to run on the architecture for a Nintendo 3DS, and another may be compiled to run on the architecture for the Nintendo Switch. In other examples, a game device may run an emulator program that is used to emulate a given operating system or other system software. Thus, for example, a computing device that is running Linux may also run emulator software the emulates, for example, the Nintendo Entertainment System (NES). This may thus allow the same computing device to operate games and other applications that were not originally programmed to developed for such architectures (e.g., NES games may be executed via an emulator on the game device running Linux). In certain example embodiments, starting a game program according to the techniques herein may also include starting an emulator program for that game program.

Accordingly, the game programs can be executed on different computing platforms that may vary based on the underlying physical hardware of the respective computing device and/or the system or other software, firmware, or the like that is provided on such computing devices to enable execution of application programs (e.g., video game applications, etc.).

Game devices 100 and 102 communicate with one another via computer network 110 by using, for example network interface devices 406. In certain examples, computer network 110 includes include a home, work, or other private network that allows computers thereon to communicate using local area network (LAN) communication techniques (e.g., via Ethernet—802.3). In certain examples, computer network 110 includes or operates over the Internet or other public network. In certain examples, computer network 110 may include a "virtual" network that may be formed by, for example, a VLAN (virtual LAN) or virtual private network (VPN) application that allows for a private network to be extended across a public network (e.g., the Internet). In certain examples, computer network 110 may include or use a wireless network.

In certain examples, computer network 110 is a logical network in which all nodes (e.g., game device 100 and 102) within that network can communicate with each other via broadcast on the data-link layer. In other words, computer network 110 may provide a common broadcast domain for game device 100 and game device 102. This may include, for example, having game device 100 and 102 form a connection with one another through, for example, a TCP or UDP (or other network technology) connection. Accordingly, in certain examples, computer network 110 may include connections (e.g., wired and/or wireless, e.g., a Bluetooth connection) that are expressly formed between game device 100 and game device 102. In certain example embodiments, computer network 110 may include a service that game devices log into (e.g., via an account). In such instances, game devices that log into such a service with the same account (or accounts that are associated with each other by such service) may be considered to be on the "same" computer network 110.

Game device 100 and game device 102 store one or more application programs (e.g., game programs 106/108) that a user may use on the respective device. Such application programs may be stored in, for example, memory devices 404 and executed by processors 402 of the respective game device. In certain examples, the application programs may be stored externally from the game devices 100/102 in, for example, removable storage media (e.g., a USB flash drive, CD, DVD, optical media) and then loaded in local memory of the game device 100/102 when the application program is to be executed. In certain examples, programs may be stored on computing devices that are external (e.g., external device 416) to the respective game devices and then loaded and executed by the respective game device as needed (e.g. by downloading or otherwise loading the program from the external device 416). In certain examples, some application programs may be stored in local storage (e.g., memory devices 404) and some may be stored externally (e.g., external device 416). While many examples are discussed herein in connection with video games and video game application programs, the techniques herein are applicable to other types of applications and uses of computing technology. For example, users may use the techniques herein to switch between different computers that are running the same (or similar) applications. Such applications may include web browsers, word processing applications, spreadsheets, CAD programs, video editors, animation programs, programming development environments, and the like.

In FIG. 1A, game device 100 is executing game application program 106 for Game A and is not currently connected to computer network 110 (e.g., the two devices are not in the same broadcast domain or do not share the same data link layer). In this illustrative example, computer network 110 is a home computer network where, for example, all computing devices that connect to computer network 110 are part of the same LAN. Game device 102 is connected to computer network 110 via connection 103, which may be a wired or wireless connection that uses network interface device 404.

FIG. 1B shows that game device 100 has now connected to computer network 110 via connection 105. As with connection 103, connection 105 may be a wired or wireless connection that uses, for example, network interface device 404.

Upon connecting to computer network 110, game device 102 may assemble and then transmit game state data 120 that is based on a game execution state of game application program 106 being played by the user on game device 100. Further details of game state data 120 and assembly and transmission thereof are found in connection with FIG. 2.

Game device 102 may determine that game device 100 has connected to computer network 110 and then determine that game device 100 is currently executing game application program 106 for Game A. Based on these determinations, game device 102 may automatically start or launch game application program 108 that is also for Game A. The starting of game application program 108 may occur as a background process or the like of the game device 102 and may not even be visible to a user observing, for example, a display of game device 102. Thus, for example, a display device that is coupled to game device 102 may not visibly change even as the game application program 108 is being started (and subsequently continually updated as it receives updated game state data 120). For example, if game device 102 is running Microsoft Windows, then the desktop may remain unchanged even as game application program 108 is started on game device 102. For example, the game may not show up in the taskbar in the Windows GUI, but will show up as an active process that is being executed by the operating system. The process updates the state of the game using the game state data 120 received from game device 100. The game state data 120 is sent as a result of a human user providing inputs to game device 100 to play the game on game device 100.

As another example, a game device may have a home screen that shows the games that a user can play on that game device. For example, selected icons may be shown for all of the possible games that a user can play on that game device. When a game is automatically being loaded on such a game device, the home screen for that game device is not changed. Thus, if a user wishes to play a different game, the user can select that game as they would normally. Further, if another game is selected, then the automatically started game (e.g., which has not been switched too) may be terminated.

In certain example embodiments, when an application is being run as a background process it is not accepting and/or processing input that may be provided by a user of the computing device that is running the application. Thus, for example, while game application 108 is running as a background process on game device 102 no local input will be used to provide input for the game that is being executed. In certain example embodiments, when an application is being run as a background process no (or less) output is being generated for consumption by users of the computing device that is running the application program. For example, while game application 108 is running as a background process on game device 102, no images of the game application will be generated and displayed and/or no sounds will be generated and output.

In certain examples, executing a video game application as a background process may be similar to how certain operating systems (e.g., Microsoft Windows) handle minimizing executing applications to a task bar or the like. In certain example embodiments, executing a video game application program as a background process may be similar in nature to pausing that game. In other words, the main loop of the video game (e.g., discussed below in connection with Table 1) may stop processing altogether or may stop certain processing of the main game loop. For example, by stopping the output of audio or video and/or stopping any potentially executing physics engine processing. Instead, in this state, the video game may listen to specific messages (e.g., a resume normal operation message) from the system (e.g., the system software and the like) to resume normal operations. In this state, the game may process input that is provided to it and consume fewer (or even a minimal amount of) of processing resources (e.g., CPU cycles, memory, I/O bandwidth, GPU cycles, etc.).

In certain example embodiments, the techniques described herein may thus allow a video game process (or other application processes) to function in a manner similar to a thread being paused and waiting to be woken up or activated by the scheduler of an operating system. The techniques herein may also be applicable to video game processes that schedule tasks as part of a game loop or game processing. Individual threads and/or scheduled tasks of an executing video game application process may be suspended while the video game is executing in the background. Such threads and/or tasks may then be resumed upon the video game being returned to the foreground.

In certain example embodiments, if a user selects a preloaded and already started game via the GUI, then the game may be shown immediately (e.g., within 5 seconds, or even less than 1 second). It will be appreciated that the process of showing an already executing game application to a user may be faster than first starting that application. Video game application programs can sometimes take 30 seconds, 1 minute or more to initially load depending on the amount of assets (e.g., data) that must be loaded into volatile memory and/or created (e.g., shaders or other programs) upon initialization of the game application.

Returning to FIGS. 1A and 1B, once game application program 108 is loaded or otherwise started on game device 102, then the game state data 120 is loaded and applied to game application program 108. As the user of game device 100 plays Game A on game device 100, the game state data 120 is continually (e.g., at least every frame, ever second, every 10 seconds, or every minute) assembled and transmitted to game device 102. The updated game state data is then applied to the game application program 108 to thereby mirror the execution state of game application program 106 being executed on game device 100. With the execution states of game application programs 106 and 108 mirrored, the user of game device 100 can now seamlessly switch to playing Game A on game device 102.

When a user does switch to playing the game on game device 102, then the process that is being used to execute the video game may be changed to a foreground process. In this state, the computer process (e.g., that is being used to execute the video game) may now accept and process input provided by a user of game device 102 and/or generate output (e.g., images, sounds, etc.) that is provided to the user of the game device 102.

In certain example embodiments, input provided to a game device can be used for other applications being executed while the game program 108 is also being executed in the background. For example, a user may use a word processor program or a web browser while game program 108 is being updated based on game state data 120.

These techniques may thus allow, for example, a user who is coming home from work and playing Game A on a mobile device (e.g., game device 100) to seamlessly transition to playing Game A on a home computer system (game device 102) that is more powerful, not restricted by a battery, and/or connected to a larger display screen. The seamless transition allows the user to enjoy the mobility offered by their mobile device for playing game A and also enjoy the benefits of playing game A on their home computer system. In effect, the techniques herein may allow for the best of both (or multiple) worlds when users play games (and use other application types) between devices.

Description of FIG. 2

FIG. 2 shows an architecture diagram of an example game device 200 according to certain example embodiments. Game devices 100 and 102 may be examples of game device 200 and the features associated with one apply to the other and vice versa. Game device 200 may be implemented on the computing device 400 that is described in connection with FIG. 4.

Game device 200 includes game state module 202 that includes save state module 204, load state module 206, transfer state module 208, and listener service 210. Game device 200 also stores (e.g., in memory devices 404) game program 212 and data (e.g., art assets, etc. . . . ) for use by game program 212.

Game program 212 is a game program that is or can be executed by the game device 200. In certain example embodiments, game device 200 also stores or otherwise includes multiple different game programs that may be stored and not currently loaded by the processor of the game device 200. For example, a home computer system may store many different games that can be played by a user. The user may play a first game, then play a second game, and then go back to playing the first game. In certain examples, multiple different game programs may be loaded (e.g., started) into process space of the game device 200 and be ready for playing by a user. Loading an application includes starting an application and then loading assets and other data that is used by that application so that the application can respond to input provided by a user (or other input that is not provided by a user) and generate output (e.g., images, sounds, etc.). The startup process may also include compiling or generating other computer programs. For example, graphic shaders may be compiled when a game program is initially loaded. Shaders are computer programs that are used for performing graphic or other tasks and are compiled when a game is initially started. In certain examples, how the shaders are compiled may vary between different computing devices and may be based on, for example, the type of graphics card (e.g., GPU) that is being used by the computing device. In certain examples, shaders may be compiled or generated each time a game program is started, the first time a game program is executed on a given computing device, or based on so other determination (e.g., the GPU being changed). Accordingly, as discussed herein, the startup process for a game application program may be (relatively) time consuming.

Game program 212 may make use of (e.g., as a library or other means) game state module 202 to handle saving (via saving state module 204), loading (via load state module 206), and transferring state data (via transfer state module 208), along with listening for games being played by other game devices that are connected to the same computer network. It will be appreciated that the "modules" are shown in FIG. 2 as being separate for ease of description. Accordingly, functionality that is provided as part of the game state module 202 may be provided in one module, many different "modules" or no "module" at all (e.g., the functionality may be implemented directly into the game program 212).

Game programs may operate with what is called a "game loop." The following pseudocode in Table 1 shows an example game loop that may be implemented in game program 212.

TABLE 1

```
GameLoop{
  ReceiveInput( )
  UpdateGameState( )
  Render( ); //or more broadly generate "outputs"
}
```

Thus, a game program receives (and processes) input that is provided by a user "ReceiveInput( )" For example, a user presses a button on a keyboard. That input and other data is then used to update the game state for the game that is being played "UpdateGameState( )" For example, by updating the location of virtual objects that are in a virtual game space and the like. Images are then generated based on the game state that was just updated "Render( )" This may involve generating images using virtual cameras for a 3D game space and the like or generating images of a 2D game space. Other types of output beyond images may also be generated, such as sounds or other physical phenomena.

The game loop may be repeated many times per second (e.g., 30 or 60 times per second, or as fast as a processor can operate). In certain examples, the update of the game state may occur more frequently than the rendering of images. Indeed, each of the different functionalities provided in a game loop may be processed at different frequencies. For example, "UpdateGameState( )" may be updated 120 times per second, "Render( )" may occur 60 times per second, and "ReceiveInput( )" may occur 90 times per second.

In certain example embodiments, the game loop processing shown in Table 1 may be modified to include additional functionality as is shown in Table 2 below.

TABLE 2

```
GameLoop{
  ReceiveInput( )
  UpdateGameState( )
  LoadSaveStateData( )
  Render( );
}
```

In this example the "LoadSaveStateData( )" function may provide the functionality of game state module 202. In other words, the functionality provided by save state module 204, load state module 206, transfer state module 208, and/or listener service 210 may be provided within the pseudocode function of "UpdateGameState( )" that may be added to the game loop of a game that is being executed on game device 200.

Returning to FIG. 2 and the functionality provided by game state module 202, the save state module 204 provides functionality for saving (e.g., storing) game state data of a game that is being played by a user. Thus, for example, when the user is playing a game on a game device as is shown in FIG. 1A, the game device may use this functionality to save the game state of the game as it is continually updated based on the user's playing thereof. For example, state data may be saved to memory devices 404 of the game device. In certain example embodiments, the state data is saved to a buffer in memory (e.g., volatile memory). In certain example embodiments, state data may be saved to a file or the like. In certain example embodiments, the save state module 204 may allocate an area of volatile memory as a buffer and any data that is written to that buffer may be considered the state data that will be saved and subsequently transferred.

It will be appreciated that the nature of the state data that is saved, loaded, and/or transferred may vary from game to game. Different types of state data may be saved depending on the particular nature of the game and what data a creator of a game program decides to save. A non-limiting illustrative list of data that may be included in the state data that is saved may include; 1) position of virtual objects within a game world and their attributes or statuses; 2) current items; 3) a current map or level; 4) what is displayed on the UI; 5) speed of virtual objects; 6) input commands (e.g., that are processed via "ReceiveInput( )"); 7) other attributes or properties of virtual objects; 8) timestamp data; and/or 9) other event data.

In certain example embodiments, the game state data may be the same or similar to data that is transferred during a multiplayer game session. In certain example embodiments, the game state data may be the same or similar to data that is saved during a save game process for the game (e.g., that allows a user to resume the game at a later date/time). In certain examples, the transfer of the state data may not include every piece of data that would be needed to exactly replicate the game as it is being played on game device 100. Instead, as noted above, the game creator may decide what data is important and what data is not important. For example, a game may have a time of day or events that are determined based on some property of the game device 100 (e.g., its physical location within the world). Such data may not be included in the state data that is saved or transferred to other game devices.

In certain example embodiments, the save state module 204 may include functionality for deciding whether to save the game state of a game that is being executed. Thus, for example, during the processing of a game loop, the game program may invoke or otherwise call the save state module 204. The save state module 204 may then determine if the game state for the game that is being played should be saved. Such functionality may include saving every time there is an update to the game state (e.g., when new input is received), only saving every X number of updates, only saving when new input is received or determining whether an update (or the results of an update to a game state) should be saved. For example, if a game state has not changed since a prior iteration of a game loop, then the saving (or transferring) of the game state may be skipped. In certain examples, no state data may be saved if such data will not also be transferred. In other words, if no other game device is interested in the state data, then such data may not be saved. In certain examples, saving and/or transferring state data may be based on data received from another game device. For example, a receiving game device may request 1 update per second.

The load state module 206 is the counterpart to the save state module 204 and is responsible for loading a game state data into a running game. This module allows for a game program that is operating on a second game device to remain synchronized to a game program that is being used to play the game on a first game device. The load state module 206 receives state data and loads it into an executing game program that then executes the game (e.g., the game loop) based on the state data.

In certain example embodiments, the load state module 206 may determine whether to apply (e.g., load) the state data to an executing game program. In certain example embodiments, a queue (e.g., that is stored in memory devices 404) may be used to queue up state data that is received from sending computing devices. For example, state data may be received at a rate faster than is possible for the computing device to apply such state data to the game program. Similarly, multiple instances of state data may be received at the same time. The queue may allow the game device to thus process the game state data in the order that it is received (or more precisely, the order it is saved or transmitted). In certain examples, no queue is used and the most recent game data is applied. Thus, any "old" state data may be dropped in favor of more recent state data updates (e.g., similar to how "frames" may be dropped when rendering images for a video game or packets are dropped when two computing devices are communicating).

In certain example embodiments, the game device 200 may have multiple different game programs executing at the same time. For example, game A (e.g., a racing game) and game B (a puzzle game) may both be executing on the same game device and different state data for those games may be applied to the respective games. In other words, a first game device may be used to play a racing game, a second device may be used to play a puzzle game, and a third, idle, device may start both games so as to be ready to seamlessly transition to either of the two games. In certain examples, the presence of multiple active games on the same computer network may cause any idle devices to not load any game. In certain example embodiments, the most recently started game (e.g., the last game to be "discovered" on the network) may be started by the third device while the other game is ignored (or stop in favor of the newer game). In certain examples, the first game to be discovered may be started while more recent games that are discovered are ignored. In certain examples, if a first game is already loaded on a second device when a second game is started on a third device, then the first game may remain to receive updates of state data while the second game is ignored.

Transfer state module 208 handles transmitting or otherwise sending state data to other computing devices. When state data is saved using the save state module 204, the transfer state module 208 may then communicate the saved data state to one or more remote computing devices (e.g., game device 102 or other external devices 416).

In certain example embodiments, the transfer state module 208 may determine whether data will be sent to other computer devices independently of whether the state data may be stored/saved. For example, state data may be stored every second (or every frame of a game loop), but may be sent to another computing device every 5 seconds. In certain examples, the determination of whether to send the state data may be based on the quality of a connection that the sending computing device (e.g., game device 100) has with the receiving computing device (e.g., game device 102). For example, if both computing devices are on the same LAN with low latency (e.g., less than 10 ms) and/or high bandwidth (e.g., 10 or 100 Mbit/s or greater), then the update frequency for transferring state data may be increased. However, if the connection between the two computing devices has higher latency (e.g., if the connection is over the Internet using a VPN or other technique such that the latency is greater than 10 ms or the like) and the same or lower bandwidth than a LAN connection, then the transfer state module 208 may use a lower update frequency for the state data (e.g., as compared to the LAN example).

In certain example embodiments, the frequency of the updates may dynamically change be based on the quality of the connection (e.g., which is a function of the bandwidth, packet loss, and/or latency of the connection) between the sending and receiving game devices.

In certain example embodiments, the transfer state module 208 may send diffs between two successive buffered portions of state data. Such an approach may be advantageous in conserving resources for games that may not often change their game state. In certain example embodiments, if there is no change, then no update may be sent by the transfer state module 208.

In certain example embodiments, the amount of data that is transferred via the transfer state module 208 may be less than 1 MB/sec (e.g., measured in KB/sec). It will be appreciated that the size of the state data may vary based on the type of game and/or other factors. For example, synchronizing the game state of a game of chess may require a smaller size of update than other types of games. In certain examples, similar game types may have different game states that are transferred as what is transferred for a given game may depend on how the developer of that game defines the state data. In certain instances, all data for a game that is stored in RAM for an executing game may be used as the game state data that is transferred. In other examples, just the positions of objects and other properties of those objects may be the game state data that is transferred.

In certain examples, the transfer state module 208 may determine not to transmit or otherwise transfer state data if there are no other computing devices connected to the same computer network 110. In certain examples, the transfer state module 208 may determine not to transmit or otherwise transfer state data if no other computing devices have subscribed or otherwise indicated an interest in the state data being saved by that device.

In certain example embodiments, the state data that is saved and/or transferred may be stored to non-volatile memory (e.g., disk) for later use. Such storage much function as an archive or historical buffer of multiple different instances of state data. The non-volatile memory may be located on the computing device sending the save state data, the computing device(s) receiving the state data, or another computing device that is used to, for example, archive or otherwise store the received state data. In such instances, multiple different instances of state data may be stored in conjunction with each other (e.g., time x, x+1, x+2, etc.). In certain example embodiments, the storage of multiple different instances of state data (which may include diffs between different instances) may be used to allow users to "rewind" gameplay of a video game. For example, after a user switches to playing on game device 102, the user may "rewind" game they are playing by causing save state data from a prior time point to be loaded (e.g., by 5 second, 10 seconds, 1 minute, etc. . . . ). In certain examples, this state data may also be used to rewind gameplay on the device that is generating the state data (e.g., game device 100).

In certain example embodiments, interpolation (or extrapolation) may be used to determine or generate game state data based on stored instances of state data. For example, if two states (s1 and s2) are received and separated by n seconds, respectively, at t1 and t2 (t1+n) and these states contain or reference positions (p1 and p2) for a character in a virtual world, a third position may be determined. In certain examples, a position (p3) could be calculated for any amount of time m with 0<=m<=n using, for example, a linear interpolation where p3=p1+(p2−p1)*(m/2). This could allow for new states to be generated or derived between =t1+t2. In certain examples, if s1 and s2 are stored every, for example 60 frames, then frames between the frames associated with s1 and s2 may be generated and determined based on a determined s3 state (e.g., which include p3). This may allow for a frame by frame rewind operation (e.g., as the state for each frame may be determined). In certain examples, state data may be extrapolated based on two or more states. For example, if s1 and s2 are saved and/or transmitted every 10 seconds, then a state s3 at time t1+n+m (where m is less than n) may be generated and used as state data.

In certain example embodiments, the transfer state module 208 retains a list of remote computing devices that the state data will be sent to. In other words, remote computing devices (e.g., game device 102) may subscribe or notify the game device that is saving the state data that the state data should be sent to the respective remote computing device. In certain example embodiments, game device 200 may broadcast the state data over the computer network that it is connected to. This may allow all computers that are listening for broadcasts to receive and process the sent state data. In such instances, the sending game device may not "know" what game devices are receiving (and acting upon) the game state data that is being broadcast.

In certain example embodiments, the transfer state module 208 may add additional metadata to the state data that is being transmitted. The metadata may include, for example, the game or other application name, a version number, a user identifier or name (e.g., of the user playing the game on game device 100), and other data. The metadata may be used by computing device that receives the state data to determine what game or other application the state data is associated with. This metadata may then be used to start or launch a game program on a receiving device.

Listener Service 210 is a service (e.g., a background process) that may be implemented on each or any external devices 416. The listener service 210 is used to determine when another computing device is connected to the same computer network 110 and is playing a game for which state data is being saved and transmitted as discussed herein.

In certain examples, the listener service 210 periodically broadcasts a data message that it is interested in receiving state data regarding the execution of application programs on other computing devices. Such messages may be used to subscribe or otherwise notify the other computing devices to send state data to the computing device that is executing the listener service 210. In certain examples, each game device that is saving state data may broadcast a message to solicit other game devices to subscribe and receive such state data. Each subscription between two different game devices may result in a connection being formed between those devices and the state data being streamed to the subscribing device via that connection.

As noted herein, a game device may include metadata along with the state data that is being transmitted over the computer network 110. Upon reception of such state data, a computing device may determine the application that is associated with the state data and, as needed, responsively launch or otherwise start the application program on the device. The state data may then be applied to the just launched application program on the receiving game device.

Description of FIG. 3

FIG. 3 is a signal diagram showing communication between the game devices of FIGS. 1A and 1B according to certain example embodiments.

At 300, a user is playing a game on game device 100. More particularly, a game program for the game has been loaded into memory of the game device and is being executed by the one or more processors 402 of the game device 100.

It will be appreciated that while games and game programs and the like are discussed herein, the techniques of certain example embodiments in connection with game programs and game may be applied to other types of application programs. For example, word processing applications, presentation applications, media application (e.g., movie players, etc.).

At 302 game device 102 is connected to a computer network and listens on that network to detect, at 304, whether any other computer devices connected to the network are executing games that are being played. As discussed above in connection with FIG. 2, this may involve, for example, running the listener service 210.

In certain example embodiments, game state module 202 and/or listener service 210 may provide for wake on LAN functionality such that game device 102 may sleep or be off until the detection of network activity on computer network 110. Once detected, the game device 102 may switch on and then determine what other devices are connected and/or what games are being played on those devices.

At 306, game device 100 connects to the same computer network that game device 102 is connected to. In certain examples, this may occur by the game device 100 automatically (e.g., without input from the user) connecting to a wireless network or the like and automatically providing, for example, the security key for that network. For example, the user of game device 100 may return from work with game device 100. The game device 100 may, upon detecting the presence of the home network of the user, automatically join that network when game device 100 comes within range of the wireless signal for the home network. In certain example embodiments, the connection to the same computer network that game device 102 is connected to may occur in response to the user expressly connecting to the network. For example, the user of game device 100 may connect to the network using a VPN application to join the network that game device 102 is a part of.

In certain example embodiments, if more than one game device is detected on the network as playing a video game, then game device 102 will not initiate preloading or starting of any game. For example, if game A is being played on one device and game B is being played on another device (or if two separate instances of the same game are being played on different devices), then game device 102 will not start either of the games. In certain example embodiments, separate instances of the respective games may be started and run on the same game device—e.g., both game A and game B may be started and updated according to the techniques discussed herein.

At 308, game devices 100 and 102 perform device discovery techniques in order to determine the presence of other game devices on the same network. This step may include each device discovering every other device that is on the same network. In certain examples, this may also include having the game device 102 determine what game program is being executed on game device 100. In certain examples, game device 100 may be connected to a network prior to game device 102. In other words, the ordering of the two (or more) game devices connecting to the same network may vary depending on a given situation.

In certain examples, the game and device discovery process 308 may include functionality that automatically determines if a device can or is willing to receive state data updates (and correspondingly automatically start a game). For example, a game device that is currently being used to play a game may not subscribe or be interested in other games being played on the network. Thus, if game device 102 is being used to play game B, and game device 100 is being used to play game A, then both devices may find each other, but neither device may be interested in receiving state data from the other. Similarly, a game device may be setup (e.g., as a configuration parameter) so that it does not receive state data updates and/or automatically preload games. Such configurations may be advantageous as automatically running a game (even without rendering images) may still consume the battery life of mobile devices.

As noted herein, executing a game on a game device may require more power than when the computing device is idle, when the computing device is handling less intensive computing operations, and/or when game program 108 is not being executed. In certain example embodiments, each or any of the game devices may obtain or determine power consumption data for the amount of power that is being used by the game device. Each or any of the game devices may determine how much power is needed for: 1) executing the game program 108; 2) sending game state data, 3) receiving game state data, and/or 4) applying received game state data 120 to game program 108. In certain example embodiments, game device 102 may then, for example, adjust the frequency by which game state data is applied, sent, or received. Thus, for example, a higher update frequency (e.g., 5 times per second) of game state data to game program 108 will require or consume more power than a lower update frequency (1 per minute). In certain example embodiments, the frequency by which game state data 120 is communicated between game device 100 to game device 102 may remain unchanged while the frequency at which game state data 120 is applied to game 108 is adjusted. In other examples, the frequency by which game state data 120 is communicated between game device 100 to game device 102 is updated.

In certain example embodiments, the game device 102 may dynamically adjust the power consumption (e.g., by alternating how often game state data is applied to game program 108) towards a target threshold level. Thus, if game device 200 is idle and being used to execute game program 21, there may be more power (e.g., processing resources) that are available for executing game program 108 and applying game state data thereto. Conversely, updates may be decreased (relatively) if the game device 102 is being used for other tasks (e.g., non-game playing uses, such as web browsing or the like).

In certain example embodiments, power consumption data may be communicated between game devices and this data may be used to determine how often, for example, game device 100 sends game state data 120 to game device 102. In certain example embodiments, game devices will use their own power consumption data to request updates from sending game devices at a certain frequency. In certain example embodiments, game devices will use their own power consumption data to apply game state data at a certain frequency.

Using power consumption usage data may thus allow mobile devices to preserve battery life and/or for computing devices that are operating via continuously supplied power (e.g., AC power) to consume less power. It will be appreciated that applying game state data to a game program that is executing in the background may require less updates per second than a game program that is actively being used by a user (e.g., that is accepting inputs and/or providing outputs such as images and/or sound). With such lower update frequencies the processing system of, for example, game device 102 may operate at a lower speed (e.g., the CPU may operate at a lower clock frequency than otherwise). This may, in turn, lower the power consumption of game device 102.

In certain example embodiments, the device discovery process may include determining the physical locations of the game devices and how close they are to one another. This may include using GPS or other techniques for determining the location of a device. For example, if a device is outside of a certain radius or distance from the user (or the device being used by the user to play a game) then it will not be eligible to receive state data from another device until the devices come within some range of each other.

In certain example embodiments, the game/device discovery process may include determining the details about the receiving game device. Such data may then be used to customize or tailor the type of state data (or other metadata) that is to be transmitted to game device 102.

In any event, at 312, upon detecting the presence of game device 100 on the same computer network as game device 102 and the current game being executed on game device 100, game device 102 may start (e.g., automatically and without a user providing input to game device 102) the indicated game that is being played on game device 100. In other words, game device 102 may pre-load a game program for game A based on detection of the presence of another game device on the computer network that is already playing game A.

As discussed herein, game device 102 may determine the game being played on game device 100 via metadata that transmitted from game device 100 as part of the game and device discovery process. Such metadata may also be included as part of transmitted state data that is transmitted from game device 100. In certain example embodiments, the starting of game at 312 may not be visible to a user that is watching game device 102. For example, a display screen for game device 102 may be turned off, or evidence of the game being started may not be immediately visible. For example, the game may be started in the background (e.g., as a background process) and it may not be immediately apparent to a user watching or viewing game device 102 that a game has started or is loading.

In certain example embodiments, game device 100 may send additional data to game device 102 to facilitate the game start at 312. For example, if the game being played compiles shaders upon starting the game application program and the architecture of game device 100 and 102 allows for such (e.g., they use the same GPU), then the shaders already compiled on game device 100 may be transmitted to game device 102. Such processing may allow the starting game to skip the compile process for the shaders used by the game application program and thereby more quickly start the game (and thus more quickly apply game state data). Thus, in certain example embodiments, the nature of the state data (or other data) that is being transmitted may be tailored or based on the properties or attributes of game device 102 (or its components).

The example techniques discussed herein thus may allow for a game to be pre-loaded on a game device before a user switches to using that game device. Thus, the techniques described herein allow for automatically recognizing or otherwise determining when another game device is playing a game on the same network (e.g., when a new game device joins the same computer network) and then automatically launching that game without express input from a user. The launched game is then executed in the background based on state data sent from the other device in order to facilitate a seamless transition between game devices by a user.

In certain example embodiments, when a game is being initially started (e.g., as in step 312), the graphical user interface may display a progress or loading bar as part of the GUI of game device 102. This bar may provide a way for the user to know if a game is ready for a seamless transition (or that a game is being loaded in the background).

At 310, the state data of the game that is being played on game device 100 is saved. For example, by using the save state module 204. The state data is then communicated to game device 102 at 314. The user continues to play the game at 316 and this continues in a loop (saving, transmitting, playing). The state data for the game that is being played on game device 100 is thereby streamed to game device 102 for use thereon. The loop repeats until the user stops playing (e.g., they exit or shutdown the game application program that is being used on game device 100) or the user transitions to playing on game device 102 (which is discussed elsewhere herein).

Upon receiving the game state data that is communicated at 314, game device 102 loads the newly received game state data into the game program that has already been started and applies it to the game program at 318. This may be accomplished by, as discussed above, the load state module 206. It will be appreciated that the game device 102 may not display (e.g., render) any images as a result of executing the game. In other words, the "render" step (or the generation of other output data) in the above discussed game loop may be skipped. Instead, the loop may be used to update the game state without rendering the results of such updates. Skipping over the render step on the game device 102 when it is not being used to "play" the game may also advantageously affect the performance of the game on that device. Similarly, while the game state data is being communicated from game device 100 and subsequently applied at 318, the game device 102 may ignore or prevent inputs provided to device 102 from being used as inputs for the preloaded game program thereon Game device 102 continues to receive game state data and execute the game based on that received data until a user indicates that they wish to start playing the game on the game device 102 at 320. In certain example embodiments, the indication of a user starting to play the game at 320 may be provided by the user using a predetermined button or providing a predetermined input on game device 102. For example, if game device 102 is a home video game console with game controllers, then the user may press buttons A and B to provide a command that switches the gameplay from game device 100 to game device 102.

Once the user presses the predetermined button or otherwise initiates a switch to play the game on game device 102, the game device 102 may switch from executing the game program based on streamed state data, to executing the game program based on input provided from the user of game device 102. In other words, the game state that is maintained by the game program on game device 102 is switched from being updated based on the streamed state data, to being updated based on input provided from the user of game device 102. In certain examples, the execution of the game program (e.g., for each time the game state maintained by game program 102 is updated) may either be based on state data received from game device 100 or may be based on input received from a user playing via game device 102, but not both. In certain instances, both game state data from game device 100 and inputs from game device 102 may be used for a certain period of time (e.g., a transition time) that allows a user to transition to playing the game on game device 102 from game device 100.

In certain instances, streamed state data may be received after a user has switched to playing on game device 102. In such instances, state data that is received by game device 102 may be ignored or otherwise dropped.

In certain example embodiments, game device 102 may display all of the games that are playable on game device and may 102 highlight or otherwise indicate (e.g., the icon for that game that is shown as part of a GUI) that the game being played on game device 100 has been preloaded and is being continually updated based on provide state data. Thus, when a user selects that game, the game will seamlessly transition to being played on game device 102. In certain instances, another game may be started on game device 102. This may cause the game that was preloaded to exit or terminate and the game device 102 to unsubscribe from state data updates provided by game device 100.

When a user starts playing the preloaded game at 320 on game device 102, then game device 102 communicates, at 322, to game device 100 that control of the game has been switched to game device 102. In certain example embodiments, the triggering of a switch between game devices may automatically pause the game that is being played to allow the user switch between devices. In certain examples, the length of the pause may be controlled by the game state module 202 and may be, for example 1 second, 5 seconds, or 10 seconds or more.

In certain example embodiments, the user of game device 100 may stop playing the game on game device 100 without switching to game device 102. In such circumstances, game device 100 may send a "final" update regarding the state data that the game is stopping (e.g., the act of stopping the game on game device 100 may be included in the state data). This may cause the game device 102 to automatically stop executing (e.g., terminate) the game that was started at step 312.

In certain example embodiments, if game device 102 does not receive an update within a given time period (e.g., 1 minute, 5 minutes, etc.), then game device 102 will automatically stop executing the game that was started at step 312. Such functionality may thus account for game device 100 leaving computer network 110 while the game thereon is still being played. For example, if the user carries game device 100 outside of the range of a wireless access point that is associated with computer network 110.

Returning to FIG. 3, game device 100 receives the notification of switching at 322 and then automatically controls the game device 100 to turn off or terminate the game that was being played on game device 100. This may result in game device 100 becoming a listener game device (like game device 102) at 324. The operations and functionality discussed in connection with game device 102 may now occur on game device 100.

In certain example embodiments, once a switch is complete and game device 100 is no longer being used to play the game, then the graphical user interface (GUI) of the game device 100 may return to a home screen or other landing screen. In certain example embodiments, when game device 100 returns to the home screen, the game program that was previously being used may be moved to the background. In this state, the game device 100 may then proceed to update the game state, which is now running in the background on game device 100, for the game that is now being played by a user (e.g., in the foreground) on game device 102.

Similarly, once the user starts playing the game on game device 102, then game device 102 effectively becomes the game playing device at 326 and the operations and functionality that were discussed in connection with game device 100 may now apply to game device 102. Accordingly, game device 100, which was executing game program 106 in the foreground, is now executing game program 106 in the background. Conversely, game device 102, which was executing game program 108 in the background, is now executing game program 108 in the foreground on game device 102.

It will be appreciated that game devices 100 and 102 (and other possible game devices) may repeatedly (e.g., seamlessly) be used to switch which device is being used to play a given game. Thus, a user may start out playing a game on their mobile device while taking the train home from work, switch to playing the game on their home video game console system when they first arrive home, and then switch back to the mobile device as they are sitting in bed. Each of the switches may occur seamlessly for the user as the respective game devices switch between actively being used by the user and listening for and applying game state data to the same game.

In certain example embodiments, the state data may be transmitted from game device 100 to an intermediary server, which then communicates the state data to game device 102. In certain example embodiments, the intermediary server may function as a cloud save location for the state data and a computer network between game device 100 and 102 may be determined by, for example, both game devices being associated with the same account that is associated with the server. Thus, a computer network may include situations in which game device 100 and 102 are both logged in (or otherwise registered) with a game service that provides a server for transferring or storing state data.

In certain example embodiments, state data may only be transferred between game devices that are associated with the same account or account group. For example, multiple accounts (one for each member of a family) may belong or be associated with the same account group (e.g., a "family" group or account). Thus, if there are multiple game devices on the same network, only those game devices that are logged in with the same account (or an account within the same group) may be eligible for switching according to the example embodiments discussed herein.

In certain example embodiments, a game device can either be a listener device or a device that is sending state data, but it cannot be both. For example, if game device 102 is receiving state data for game A, but a user desires to play game B on game device 102, then the starting of game B may terminate the computer process associated with game A. At this point, game device 102 would transition from receiving state data regarding game A, to communicating and saving state data regarding game B.

In certain example embodiments, a game device may be both a listener and sender. For example, a user may play game A, while also keeping game B (which is being played on another device) updated in the background.

Figure 4:
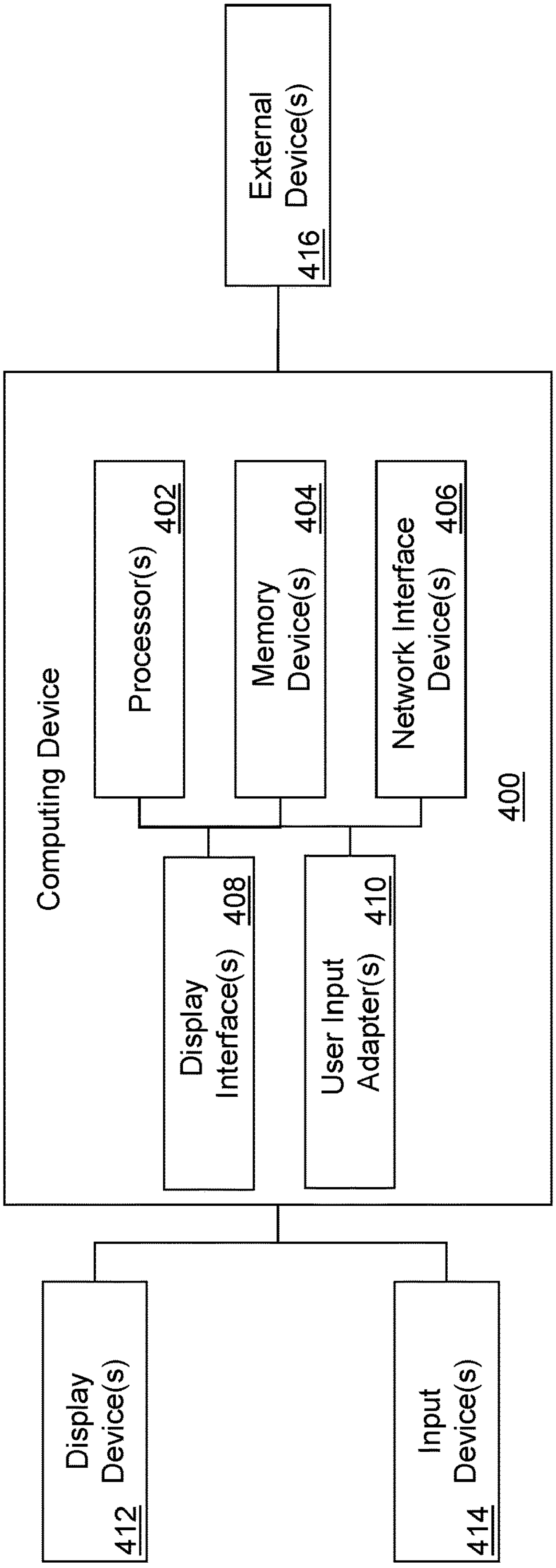
FIG. 4 shows an example computing device that may be used in some embodiments to implement features described herein.

Description of FIG. 4

FIG. 4 is a block diagram of an example computing device 400 (which may also be referred to, for example, as a "computing device," "computer system," or "computing system") according to some embodiments. In some embodiments, the computing device 400 includes one or more of the following: one or more processors 402; one or more memory devices 404; one or more network interface devices 406; one or more display interfaces 408; and one or more user input adapters 410. Additionally, in some embodiments, the computing device 400 is connected to or includes one or more display devices 412. Additionally, in some embodiments, the computing device 400 is connected to or includes one or more input devices 414. In some embodiments, computing device 400 may be connected to one or more external devices 416. As will be explained below, these elements (e.g., the processors 402, memory devices 404, network interface devices 406, display interfaces 408, user input adapters 410, display devices 412, input devices 414, external devices 416) are hardware devices (for example, electronic circuits or combinations of circuits) that are configured to perform various different functions for and/or in conjunction with the computing device 400.

In some embodiments, each or any of the processors 402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes, for example, a CPU, a GPU, and other hardware components such as memory and/or a memory controller (e.g., Northbridge), I/O controller (e.g., Southbridge), networking interfaces, and the like). In some embodiments, each or any of the processors

402 uses an instruction set architecture such as x86 or Advanced RISC Machine (ARM). In some embodiments, each or any of the processors 402 is or includes, for example, a graphical processing unit (GPU), which may be an electronic circuit designed to generate images and the like.

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions that may be executed by one or more of the processors 402), or other type of device that performs the volatile or non-volatile storage of data and/or instructions (e.g., software that is executed on or by processors 402). Memory devices 404 are an example of non-transitory computer-readable storage.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (e.g., IEEE 802.11), GSM, CDMA2000, UMTS, LTE, LTE-Advanced (LTE-A), and/or other short-range (e.g., Bluetooth Low Energy, RFID), mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 408 is or includes one or more circuits that receive data from the processors 402 (e.g., via a discrete GPU, an integrated GPU, a CPU executing graphical processing, or the like) that are used to generate corresponding image data based on the received data, and/or output (e.g., a High-Definition Multimedia Interface (HDMI), a DisplayPort Interface, a Video Graphics Array (VGA) interface, a Digital Video Interface (DVI), or the like) the generated image data to the display device 412, which displays the image data thereon. Alternatively or additionally, in some embodiments, each or any of the display interfaces 408 is or includes, for example, a video card, video adapter, or graphics processing unit (GPU). In other words, the each or any of the display interfaces 408 may include a processor therein that is used to generate image data. The generation or such images may occur in conjunction with processing performed by one or more of the processors 402.

In some embodiments, each or any of the user input adapters 410 is or includes one or more circuits that receive and process user input data from one or more user input devices (414) that are included in, attached to, or otherwise in communication with the computing device 400, and that output data based on the received input data to the processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices 414.

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 412 is connected to the computing device 400 (e.g., is external to the computing device 400 and communicates with the computing device 400 via a wire and/or via wireless communication technology), the display device 412 is, for example, an external monitor, projector, television, display screen, etc. . . . .

In some embodiments, each or any of the input devices 414 is or includes machinery and/or electronics that generates a signal that is provided to the user input adapter(s) 410 in response to physical phenomenon. Examples of inputs devices 414 include, for example, a keyboard, a mouse, a trackpad, a touchscreen, a button, a joystick, a sensor (e.g., an acceleration sensor, a gyro sensor, a temperature sensor, and the like). In some examples, one or more input devices 414 generate signals that are provided in response to a user providing an input—for example, by pressing a button or actuating a joystick. In other examples, one or more input devices generate signals based on sensed physical quantities (e.g., such as force, temperature, etc.). In some embodiments, each or any of the input devices 414 is a component of the computing device (for example, a button is provide on a housing that includes the processors 402, memory devices 404, network interface devices 406, display interfaces 408, user input adapters 410, and the like).

In some embodiments, each or any of the external device(s) 416 includes further computing devices (e.g., other instances of computing device 400) that communicate with computing device 400. Examples may include a server computer, a client computer system, a mobile computing device, a cloud-based computer system, a computing node, an Internet of Things (IoT) device, etc. that all may communicate with computing device 400. In general, external devices(s) 416 may include devices that communicate (e.g., electronically) with computing device 400. As an example, computing device 400 may be a game device that communicates over the Internet with a server computer system that is an example of external device 416. Conversely, computing device 400 may be a server computer system that communicates with a game device that is an example external device 416.

In various embodiments, the computing device 400 includes one, or two, or three, four, or more of each or any of the above-mentioned elements (e.g., the processor(s) 402, memory device(s) 404, network interface device(s) 406, display interface(s) 408, user input adapter(s) 410, display device(s) 412, input device(s) 414). Alternatively or additionally, in some embodiments, the computing device 400 includes one or more of: a processing system that includes the processors 402; a memory or storage system that includes the memory devices 404; and a network interface system that includes the network interface devices 406.

The computing device 400 may be arranged, in various embodiments, in many different ways. As just one example, the computing device 400 may be arranged such that the processors 402 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 400 may be arranged such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk. As another example, the computing device 400 may include a SoC with one or processors 402, plural network interface devices 406, memory devices 404 that include system memory and memory for application programs and other software, a display interface 408 that is configured to output a video signal, a display device 412 that is integrated to a housing with the mentioned and layered with a touch screen input device 414, and multiple input device 414 such as one or more joysticks, one or more buttons, and one or more sensors.

As previously noted, whenever it is described in this document that a software module or software process performs any action, the action is in actuality performed by underlying hardware elements according to the instructions that comprise the software module. Consistent with the foregoing, in various embodiments, each or any combination of game device 100, game device 102, game program 106, game program 108, game device 200, game program 212, game state module 202, save state module 204, load state module 206, transfer state module 208, listener service 210, each of which will be referred to individually for clarity as a "component" for the remainder of this paragraph, are implemented using an example of the computing device 400 of FIG. 4. In such embodiments, the following applies for each component: (a) the elements of the 400 computing device 400 shown in FIG. 4 (i.e., the one or more processors 402, one or more memory devices 404, one or more network interface devices 406, one or more display interfaces 408, and one or more user input adapters 410), or appropriate combinations or subsets of the foregoing, with or without the one or more display devices 412, one or more input devices 414, and/or external devices 416) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 404 (e.g., in various embodiments, in a volatile memory device such as a RAM or an instruction register and/or in a non-volatile memory device such as a flash memory or hard disk) and all actions described herein as performed by the software modules are performed by the processors 402 in conjunction with, as appropriate, the other elements in and/or connected to the computing device 400 (e.g., the network interface devices 406, display interfaces 408, user input adapters 410, display device(s) 412, input device(s) 414, and/or external device(s) 416); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (e.g., the network interface devices 406, display interfaces 408, user input adapters 410, display device 412, input device(s) 414, and/or external device(s) 416); (d) alternatively or additionally, in some embodiments, the memory devices 402 store instructions that, when executed by the processors 402, cause the processors 402 to perform, in conjunction with, as appropriate, the other elements in and/or connected to the computing device 400 (e.g., the memory devices 404, network interface devices 406, display interfaces 408, user input adapters 410, display device(s) 412, input device(s) 414, and/or external device(s) 416), each or any combination of actions described herein as performed by the component and/or by any software modules described herein as included within the component.

Consistent with the foregoing, as one example, in an embodiment where an instance of the computing device 400 is used to implement game device 200, the memory devices 404 could load and/or store a game program that is played by a user on game device 200. Memory devices 404 may also store state data of the executing game program. Processors 402 could be used to operate the game loop of the game program and functionality described in connection with the game state module 202. Display devices 412 (e.g., an LCD or the like) may be used to output images that are based on performance or execution of the game program. Conversely, another instance of the game program may be executing on another instance of computing device 400 without rendering or displaying images of, for example, that virtual of the corresponding video game. A video game controller (e.g., an instance of input devices 414) may allow users to provide input to the game program. Such inputs may be process by processors 402 as part of the game loop for the game program. Network interface devices 406 may be used to connect to a computer network that is used to stream game state data to external devices 416 that are (or will be) executing other instances of same game program that is executing locally.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

Technical Advantages of Described Subject Matter

The technical features described herein may thus improve the speed at which users can switch to playing the same game on a different game device. These advantages are realized by transferring game state data in an efficient manner and keeping the other game device(s) synchronized to the game state of the game being played by the user so that when the switch occurs, the transition can been quick and/or seamless.

Certain example embodiments allow for dynamically and/or seamlessly switching among game devices that are being used to play a video game. The switch may occur within seconds (e.g., less than 5 seconds or even less than 1 second) to allow a user to seamlessly transition between game devices. In certain instances, the functionality of switching according to certain techniques herein may be similar, from the perspective of the user, to docking a Nintendo Switch video game console into its docket to cause the images to be output to a television instead of the integrated display of the console. In other words, certain examples may provide for transitioning or switching between a mobile game experience provided by a handheld video game device to a home video game console experience provided by a stationary game console in a seamless manner (e.g. with an insignificant delay in switching between the two).

In certain example embodiments, a game device automatically determines what game(s) are being played by game devices on the same computer network. The game device then automatically launches a game program for the game(s) that are being played and updates the game state for the game(s) to match how the gam(s) are being played on the other game devices. Thus, when a user desires to switch to using a different game device, that device is ready for a quick and seamless transition.

In certain example embodiments, a game program that has been automatically launched or started based on detection of another game device playing the associated game may be executed in the background on the game device.

SELECTED TERMINOLOGY

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1A-3, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system for transferring video game execution, the system comprising:

a computer system that includes at least one hardware processor and electronic memory, the at least one hardware processor of the computer system configured to:

execute, based on gameplay input provided by a user, a first computer application for a video game and generate images that are displayed based on execution the first computer application, while the first computer application is being used to play the video game, communicate state data regarding the video game to another computer system; and a network of computing resources that includes a processing system with at least one hardware processor, the processing system of the network of computing resources configured to:

receive the state data that is communicated from the computer system, continually execute, without outputting images of a virtual game space of the video game for consumption by the user, a second computer application for the video game that processes the received state data, based on reception of a gameplay switch, continually execute the second computer application for the video game, and subsequent to the gameplay switch, generate images of the virtual game space of the video game and communicate the generated images to an electronic device for display thereon to allow playing the video game.

2. The system of claim 1, wherein the processing system is further configured to:

determine availability of a computer network in connection with another computer device and based on the determined availability of the computer network, start the second computer application for the video game.

3. The system of claim 1, wherein the computer system is the electronic device.

4. The system of claim 1, wherein the electronic device is a television.

5. The system of claim 1, wherein the electronic device is a mobile computing device.

6. The system of claim 1, wherein, subsequent to the gameplay switch, the processing system is further configured to receive remote gameplay input from the user, wherein the remote gameplay input is used to provide input to control aspects of the video game.

7. The system of claim 1, wherein the gameplay input provided by the user is provided via a mobile device and the generated images that are communicated are displayed on the mobile device.

8. The system of claim 1, wherein reception of the gameplay switch causes a switch notification to be transmitted to the computer system.

9. The system of claim 8, wherein the switch notification causes the computer system to change execution of the first computer application.

10. The system of claim 1, wherein the state data includes data to reproduce the state of the video game by using the processing system, wherein the state data includes positional data of a plurality of virtual objects that are located within a virtual space of the video game.

11. A system for transferring video game execution, the system comprising:

a processing system that is included a part of a network accessible computer system, the processing system including at least one hardware processor, the processing system configured to:

receive, via an electronic data network, state data that is communicated from a first computing device that is being used by a user to play a video game via a locally provided application program;

continually execute a computer application in a first mode for the video game that operates by processing the state data to modify a state of the video game without providing images of a virtual game space of the video game for consumption by the user;

based on reception of a gameplay switch command, switch to operating in a second mode where the computer application for the video game continually executes; and in the second mode, generate images of the virtual game space of the video game and communicate the generated images to an electronic device for display on a display device to allow playing the video game by the user without relying on execution of the locally provided application program for generating images of the virtual game space of the video game.

12. The system of claim 11, wherein the processing system is further configured to:

receive a network status indication; and based on reception of the network status indication start the computer application for the video game in the first mode and begin processing state data that is received.

13. The system of claim 11, wherein the first computing device and the electronic device are different.

14. The system of claim 11, wherein the first computing device and the electronic device are the same.

15. The system of claim 11, wherein, while in the first mode, no input provided via an input device that is being used by the user to play the video game is used as input data for the computer application that is continually executing in the first mode.

16. The system of claim 11, wherein the network accessible computing system is a cloud-based computer system, wherein, during the first mode, the state of the video game on the cloud-based computer system is synchronized with a state of the video game on the first computing device.

17. A non-transitory computer readable storage medium storing executable instructions for use by a processing system that is included a part of a distributed, network-based computer system, the processing system including at least one hardware processor, the stored executable instructions including instructions that are configured to cause the at least one hardware processor to perform operations comprising:

receiving, via an electronic data network, state data that is communicated from a first computing device that is being used by a user to play a video game via a locally provided application program;

continually executing a computer application in a first mode for the video game that operates by processing the state data to modify a state of the video game without providing images of a virtual game space of the video game for consumption by the user;

based on reception of a gameplay switch command, switching to operating in a second mode where the computer application for the video game continually executes; and in the second mode, generating images of the virtual game space of the video game and communicating the generated images to an electronic device for display on a display device to allow playing the video game by the user without relying on execution of the locally provided application program for generating images of the virtual game space of the video game.

18. The non-transitory computer readable storage medium of claim 17, wherein the operations further comprise:

receiving a network status indication; and based on reception of the network status indication, starting the computer application for the video game in the first mode and begin processing state data that is received.

19. The non-transitory computer readable storage medium of claim 17, wherein the first computing device and the electronic device are the same.

20. The non-transitory computer readable storage medium of claim 17, wherein the operations further comprise:

in the second mode, processing gameplay input that is provided by a user to an input device that is coupled to the electronic device, wherein the gameplay input is used to control aspects of the video game.

* * * * *